(12) United States Patent
Sesselmann et al.

(10) Patent No.: US 6,629,905 B1
(45) Date of Patent: Oct. 7, 2003

(54) DRIVE FOR ADJUSTMENT DEVICES IN MOTOR VEHICLES

(75) Inventors: Helmut Sesselmann, Steinach (DE);
Roland Feder, Weitramsdorf (DE);
Mathias Hoffmann, Coburg (DE);
Manfred Stenzel, Bamberg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 10/088,456

(22) PCT Filed: Sep. 14, 2000

(86) PCT No.: PCT/DE00/03262
§ 371 (c)(1),
(2), (4) Date: Jul. 18, 2002

(87) PCT Pub. No.: WO01/20753
PCT Pub. Date: Mar. 22, 2001

(30) Foreign Application Priority Data

Sep. 14, 1999 (DE) .......................................... 199 44 915

(51) Int. Cl.⁷ ................................................. F16H 48/06
(52) U.S. Cl. ..................... 475/149; 49/352; 254/344
(58) Field of Search ...................... 296/146.2; 49/352; 475/149; 254/344, 362

(56) References Cited

U.S. PATENT DOCUMENTS

| | | | | |
|---|---|---|---|---|
| 3,879,623 A | | 4/1975 | Miyake | |
| 4,503,732 A | * | 3/1985 | Schust | 74/625 |
| 5,035,083 A | * | 7/1991 | Kruzich | 49/352 |
| 5,098,068 A | * | 3/1992 | Jussila | 254/342 |
| 5,272,938 A | | 12/1993 | Hsu et al. | |
| 5,615,577 A | * | 4/1997 | Chen | 74/89.21 |
| 5,914,159 A | | 6/1999 | Kato | |
| 6,430,873 B1 | * | 8/2002 | Borchuk et al. | 49/352 |

FOREIGN PATENT DOCUMENTS

| | | |
|---|---|---|
| DE | 2 210 243 | 9/1973 |
| DE | 40 30 489 A1 | 4/1992 |
| DE | 44 12 898 A1 | 10/1995 |
| GB | 1 390 316 | 4/1975 |

OTHER PUBLICATIONS

International Search Report of PCT/DE00/03262, dated Jan. 11, 2001.
International Preliminary Examination Report of PCT/DE00/03262, dated Jan. 14, 2002.
English translation of International Preliminary Examination Report of PCT/DE00/03262, dated Jan. 14, 2002.

* cited by examiner

Primary Examiner—Dirk Wright
(74) Attorney, Agent, or Firm—Christie, Parker & Hale, LLP

(57) ABSTRACT

The invention relates to a drive for adjustment devices in motor vehicles, especially for a window lift. Said drive comprises a motor and a toothed gearing coupled with said motor, said toothed gearing being mounted in an at least two-piece housing and being driven by an internal gear. According to the invention on at least one housing part and bears the drive element.

26 Claims, 8 Drawing Sheets

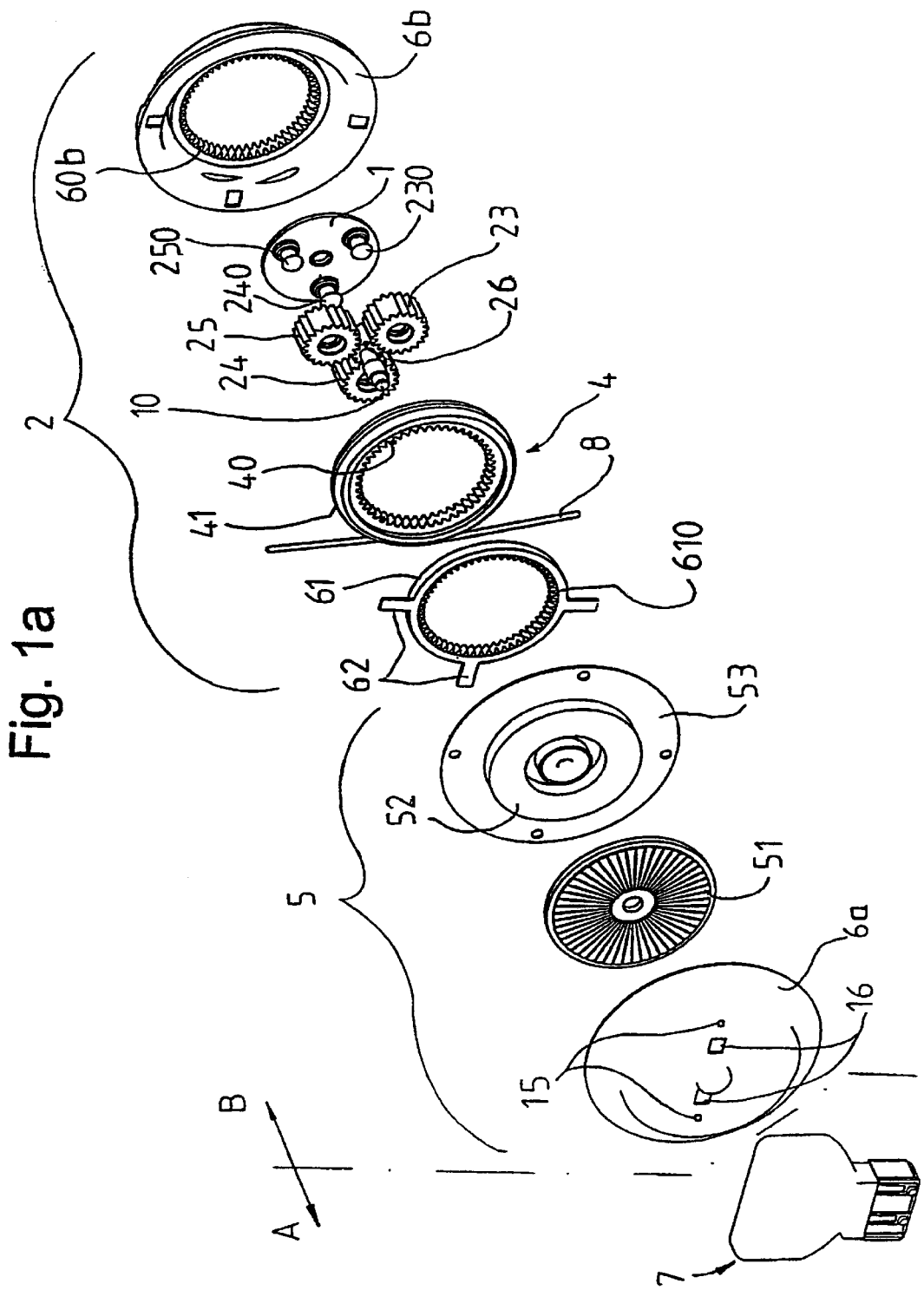

DRIVE FOR ADJUSTMENT DEVICES IN MOTOR VEHICLES

CROSS-REFERENCE TO RELATED APPLICATION

This application claims priority of International application number PCT/DE00/03262, filed Sep. 14, 2000, which in turn claims priority of German application number 199 44 915.5, filed Sep. 14, 1999.

FIELD OF THE INVENTION

The invention relates to a drive for adjustment devices in motor vehicles, more particularly for a window lifter.

BACKGROUND OF THE INVENTION

From DE OS 22 10 243 an electric drive device is known for adjusting the window in motor vehicles wherein a set of revolving gear wheels having a sun wheel and an internally toothed hollow wheel as well as several planetary wheels are coupled to an electric motor. The planetary wheels are fitted in the axial direction with two ring gears with different pitch diameters wherein the ring gears with the greater pitch diameter mesh with the sun wheel and the fixed internally toothed hollow wheel. The ring gears with the smaller pitch diameter on the other hand only mesh with the internal teeth of an output element formed as a cable drum.

From DE 40 30 489 A1 a further planetary gearing is known wherein the output element formed as the hollow wheel is driven through planetary wheels which revolve on support wheels fixed on the housing and drive the hollow wheel. The hollow wheel is provided axially on each side with circular disc-shaped guide pieces, which are guided radially along their inner circumference through rolling bearings on bearing attachments of the support wheels and support the planetary wheels against moving axially outwards.

Designs of this kind occupy a relatively large amount of structural space as a result of the axially successive arrangement of the gear elements as well as the radial overhang of the planetary wheels with the larger pitch diameter or the guide pieces over the output element. Furthermore, as a result of the central bearing on the king pin, large tilting moments occur and it is necessary to provide an expensive bearing for the output element.

From DE 44 12 898A1 a drive is known which has a motor and a toothed gearing coupled to the motor and set in a multi-part housing. In order to transfer and reduce the torque produced by the motor, the gearing has a fixed hollow wheel and a rotatable output element formed as a hollow wheel with internal teeth, in which a gearing element engages. This output element is fixedly connected to the hollow shaft which acts as the output shaft. This hollow shaft is mounted in the housing on two sections through rolling bearings wherein the rolling bearings are arranged between the external radius of the hollow shaft and the housing.

SUMMARY OF THE INVENTION

The object of the invention is to provide a drive for adjustment devices in motor vehicles that occupies little structural space, is simple to fit and enables a compact construction that can be achieved with few structural parts.

By forming a bearing device directly on at least one of the housing parts or housing halves of a divisible (multi-part) housing and supporting the output element on one such bearing area formed by the housing halves it is no longer necessary to support the output element on the motor output shaft so that this can be made shorter. Furthermore the parts required for the bearing on the shaft are omitted since the bearing for the output element, preferably a slide bearing, is produced through fitting together the housing parts. It is proposed to either coat the slide bearing regions or to provide suitable materials in order to produce an optimum sliding friction.

The bearing device is thereby preferably designed so that both axial and radial forces are absorbed and then diverted over the most direct route possible into the housing. For this the bearing device can be designed in a ring shape whereby the outer circumference of the ring-shaped bearing device corresponds to the inner circumference of the output element which is formed as a hollow wheel so that the hollow wheel need only be placed on the ring-shaped bearing device in order to produce a corresponding bearing for the output element. A bearing of this kind can be produced through a guide element projecting into the output element whereby the guide element can consist of a ring or ring sections protruding from the housing in the direction of the output element. It is likewise possible that individual guide elements, for example in the form of cylindrical pins or suitable shaped protrusions, arranged corresponding to the inner circumference of the hollow wheel of the output element, form the bearing.

As an alternative to the bearing, where guide elements project into the drive element, it is proposed that a groove be worked into the housing part or housing half in which a corresponding shaped area of the output element can engage, similar to a slide block in a slide guide.

In order to increase the degree of integration and reduce the assembly costs, it is proposed that the bearing device be formed on a part of the housing. The guide element or guide elements, already formed on the housing or the groove, are provided in the housing during its original shaping. As an alternative however, it is possible to produce the groove by subsequently fixing elements on the housing, in the same way that the guide element can be attached later, for example by adhesive, screws, welding or the like.

For technical production reasons, it is advantageous if the bearing of the output element on the housing part is formed as a slide bearing since this would save on component parts, materials and assembly costs. However, it is basically possible also to provide needle, ball or rolling bearings.

In order to achieve a compact drive which is simple to handle, it is proposed that the gearbox and motor be mounted inside the housing. Advantageously, a carrier module or door inside panel is formed as a part of the housing so that on the one hand the stability of the overall drive is increased since in this way the drive becomes an integral constituent part of the carrier module whereby expensive fixing devices can be omitted and on the other hand the production and assembly costs are reduced since overall fewer component parts are required.

A further possibility for the functional integration exists where a carrier module or door inside panel is a constituent part of the magnetic reflux, whereby a separate component part for the magnetic reflux of the motor is then unnecessary. A suitable design can be, for example where the carrier module or the door inside panel consists, at least in the region provided therefor, of a ferro-magnetic material or is coated with a material of this kind.

In a further development of the invention at least one of the housing parts has a fixed internal gear formed as a hollow wheel, whereby there is an increase in the variation for the width of the gears which can be used. Gear elements for transferring force to the output element can thereby mesh with both the internal gear of the output element and with at least one of the internal gears of the housing parts. In the case of two fixed internal gears, there is the advantage that the tilting moments which appear are taken up uniformly. The teeth of the fixed internal gears must in any case be aligned flush with each other when the force-transferring gear elements engage in the two sets of teeth. The output element in its design as an internally toothed hollow wheel is indeed also an element of the gearbox, but for reasons of clarity the output element is detailed separately.

As an alternative to an internal gear molded on the housing parts, the internal gear can also be formed by one or two separate ring gears which are made as hollow wheels whereby each ring gear is rotationally secured in the housing parts or fixed accordingly.

The gear elements, formed as gearwheels, thereby mesh with both the internal teeth of the output element and with the fixed internal teeth which are formed either in the housing parts alone or in conjunction with a separate ring gear. For this it is obviously necessary for the pitch diameter of the internal teeth of the output element to coincide substantially with the pitch diameter of the fixed internal gear. The number of teeth in the internal gear of the output element differs by at least one tooth from the number of teeth of the fixed internal gear so that when the gear elements run down on the fixed internal teeth with simultaneous engagement in the internal teeth of the output element, the output element is moved further on by the difference in the number of teeth during one complete revolution of the gear elements. In this way, a very high transmission ratio is achieved and at the same time a very compact gearbox is produced with fewer structural parts.

In order to reduce the overall weight of the gearbox, the output element which is formed as a hollow wheel can be designed ring-shaped and has the internal gear provided on the inside of the ring, preferably over the entire axial width of the inside of the ring. The outside of the ring-shaped hollow wheel is thereby preferably designed as a cable drum or as a gear wheel. The bearing of the ring-shaped hollow wheel, which advantageously has a T-shaped cross-section, is formed by a groove which is produced as the two-part housing is fitted together. Through this type of bearing, it is possible to reduce the amount of material required for the output element and to provide space for mounting the gear elements inside the hollow wheel. Furthermore, the production of the output element is facilitated and the axial structural depth is reduced.

By designing the output element as a cable drum or with external teeth, it is possible to use the gearbox in many ways. In addition to the special use as a drive for a cable window lifter, it is also possible to use this compact gearbox for arm window lifters or in other places, e.g. for seat adjustment where only a small structural space is available.

It is proposed to form the toothed gearbox in combination with a set of revolving gear wheels as a result of the high transmission ratios which can be achieved, with a Wolfrom or planetary gearbox being particularly advantageous here.

As an alternative, the toothed gearbox can also be formed in combination with a wobble gearbox, wherein to avoid the tilting movements of the bearing and to achieve dynamic balancing the wobble gearbox has two wobble wheels which are off-set by 180 degrees relative to each other. As an alternative to the wobble gearbox, it is also possible to use a harmonic-drive gearbox.

In an advantageous development of the invention, the axial extension of the gear elements is less than or equal to the maximum axial extension of the output element which has the result that the dimensions of the toothed gears are fixed substantially by the axial and radial dimensions of the output element. The maximum axial extension is thereby, as a rule, determined by the width of the cable drum or the external teeth. Furthermore, an additional protection of the gear elements is reached by mounting the gear elements inside the output element, without any extension over the output element. Furthermore, the corresponding gear housing can be kept very small and have a simple geometric shape since no projections or ledges have to be taken into consideration.

By arranging all the gear elements inside the radius of the internal gear of the hollow wheel, the maximum radial extension is determined through the external diameter of the output element which leads to a compact construction for the entire gear unit of the output element.

In another design of the invention the toothed regions of the gear elements or output element are provided with a plastic coating in order to achieve a low noise level and to ensure a smooth running of the gear wheels on each other. A plastic coating on the toothed regions furthermore has the advantage that manufacturing tolerances can be very well compensated.

In order to make the drive overall in a very compact form, the motor is preferably designed as a flat motor, wherein in particular disc rotors and flat armature motors are provided.

In an advantageous development of the invention all the components of the drive, namely the motor, the gearbox, the housing parts and the electronics unit, are configured so that during assembly they need only be supplied in one direction. Thus, for example, a housing part forms the base part which is fixed on an assembly holder and all the other component parts such as planetary support together with planetary wheels, wobble wheels, axles, armature disc and the second housing part are supplied from one and the same direction, preferably from above. This design in particular facilitates a faster assembly of the drive.

The means for supplying current to the motor are provided in the electronics unit and are contestable with the motor through openings in the housing. Thus, a mainly closed housing is produced and the external connections to the current supply of the vehicle are through the electronics unit.

Similarly, sensor elements are provided in the electronics unit and are coupled to the motor or gearbox through openings in the housing to send to the electronics unit data relating to the speed, position or power capacity of the motor. Basically it is also possible to align the sensors, e.g. optical sensors, with the gearbox in order to obtain data therefrom.

BRIEF DESCRIPTION OF THE DRAWINGS

The idea on which the invention is based will now be explained in further detail with reference to the embodiments illustrated in the drawing in which:

FIG. 1a shows an exploded view of a drive with a planetary gearbox;

FIG. 1b shows an assembled gearbox according to FIG. 1a;

FIG. 5b shows a plan view of the wobble gearbox of FIG. 5a; and

DETAILED DESCRIPTION OF THE INVENTION

Figure 1B:
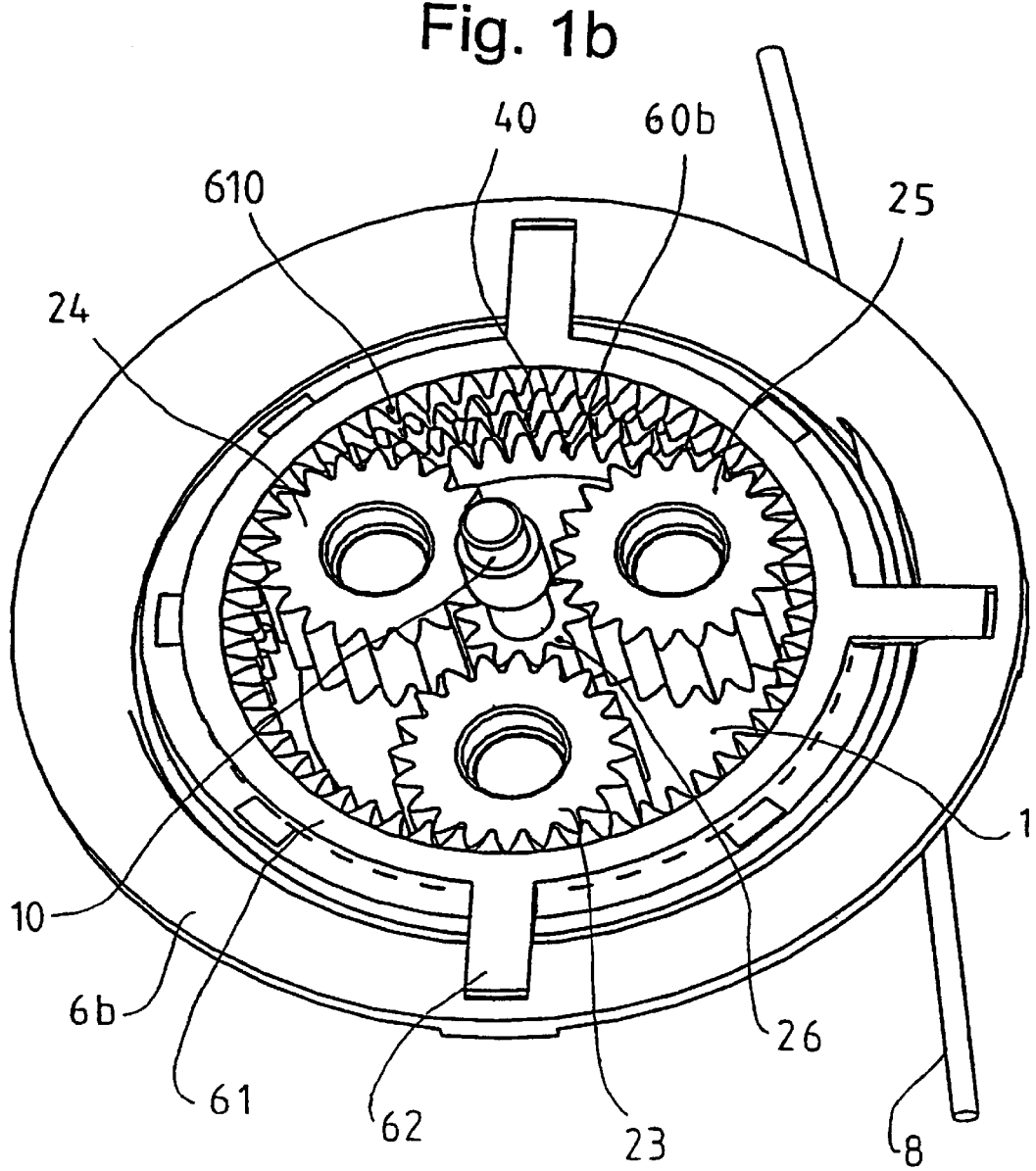

Where the component parts are the same they are provided with the same reference numerals in the relevant figures.

FIG. 1a shows in an exploded view a drive 100 in a version for a cable window lifter drive, with an electronics unit 7 which controls a motor 5 which is preferably formed as a flat motor and coupled to a gearbox 2. The motor 5 and gearbox 2 are enclosed by two housing parts 6a and 6b which have openings for the inlet and exit of a window lifter cable 8 so that the motor 5 and gearbox 6 are located inside a housing. As a result of the two part configuration of the housing, the term housing halves will be used in the description below for reasons of clarity. In the event of a multi-part variation of the housing, the term housing part will be used.

The electronics unit 7 contains, inter alia, the brushes (not shown) as well as the sensors, e.g. for the speed or setting of the motor. It is thereby proposed that the electronics unit 7 be attached on the dry space side, A, with the motor 5 and gearbox 2 being located on the wet space side, B.

In the dry space A, which is separated from the wet space B, for example, by a carrier module (not shown), the electronics unit 7 is shown with the connections required for supplying power, with the brushes as well as with the sensor devices for the positioning and speed of the motor 5. On the wet space side B are the remaining components of the drive 100, namely the motor together with the gearbox 2 and housing halves 6a and 6b.

In the housing half 6a there are, in addition to the openings 15 for the sensors, also the openings 16 for the brushes which pass through from the corresponding elements in the electronics unit 7. On the side of the housing half 6a remote from the electronics unit 7 is the armature disc 51 which is embedded between the housing half 6a and a housing cover 53 as a magnetic feedback to a magnet 52. The housing half 6a, armature disc 51 as well as the housing cover 53 together with the magnet 52 form the motor 5 which is completed by the electronics unit 7 together with the brushes. A motor output shaft 10 is fixed on the rotatable armature disc 51 and causes the rotary movement to be transferred to the gearbox 2 whereby for reasons of clarity the motor output shaft 10 is shown in connection with the gearbox 2.

The motor output shaft 10 supports a sun wheel 26 which is mounted, secured against rotation, on the output shaft and meshes with three planetary wheels 23–25 which are rotatably mounted on a planetary support 1 with rotational axes 230–250. The planetary support itself is rotatably mounted on the motor output shaft 10.

The planetary wheels 23–25 thereby mesh with both the internal teeth 60b of the housing half 6b and with the internal teeth 610 of a fixed ring gear 61 and revolve as a result of the rotatable bearing of the planetary support 1 on the fixed internal teeth 60b and 610. Similarly the planetary wheels 23–25 mesh with the internal teeth 40 of a ring-shaped output element 41 which is mounted between the fixed ring gear 61 and the housing half 6b.

The window lifter cable 8 is looped round the output element 4 where it is guided in grooves 41 on the outer circumference of the output element 4, with the output element 4 being formed as a cable drum. The cable drum is thus a constituent part of the gearbox 2.

As opposed to the fixed ring gear 61 which is secured on the fixed housing half 6b through molded tabs 62, the output element 4 is mounted rotationally movable. As an alternative to a separate ring gear 61, which is fitted subsequently into one housing half, the fixed internal gear can also be injection molded on a motor housing cover 53 wherein a magnet 52 for feedback can be integrated in the motor housing cover 53.

Figure 2:
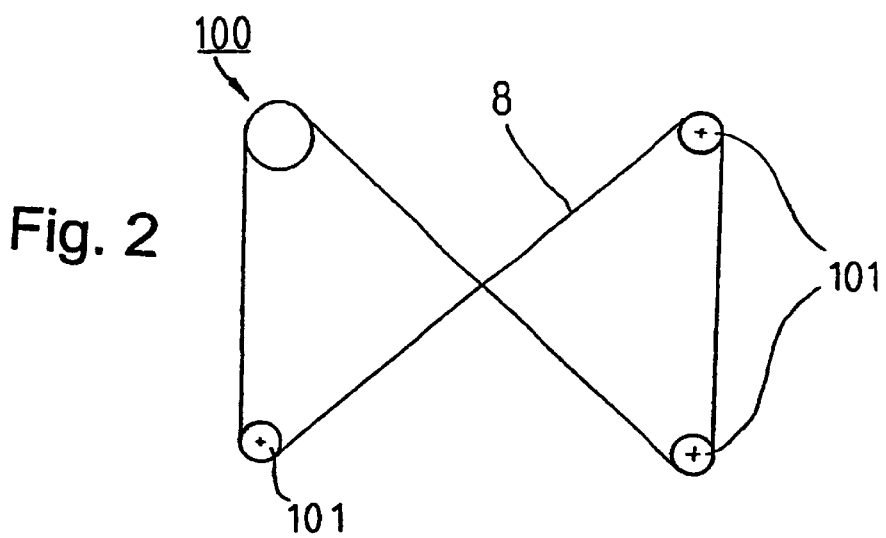
FIG. 2 shows a diagrammatic view of a cable window lifter.

FIG. 2 shows in a diagrammatic view the drive 100 and three cable guide pulleys 101, wherein the drive 100 in this embodiment undertakes at the same time the function of the fourth cable guide. The method of functioning for the cable window lifter per se is known and requires no further explanation. Apart from the window lifter drive, the compact method of construction means the drive can be used for all adjustment devices in motor vehicles, e.g. in sliding roofs or for adjusting the seat components or seats.

Figure 3:
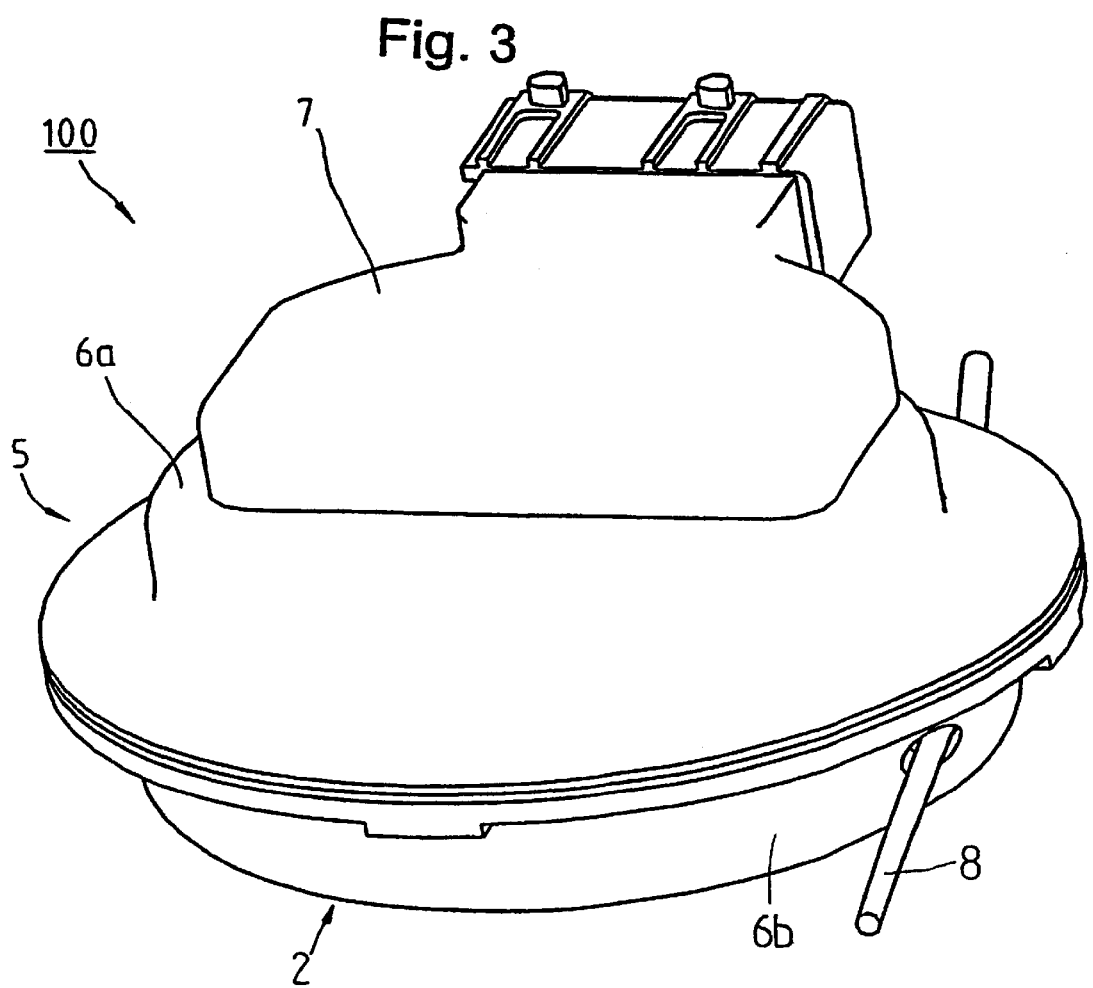
FIG. 3 shows an assembled drive.

FIG. 3 shows the drive 100 in the assembled state.

The way in which the output element 4 is set in rotational movement will now be explained with reference to FIG. 1b which shows an assembled gearbox 2 according to FIG. 1a. The sun wheel 26 is mounted, secured against rotation, on the motor output axle 10 and meshes with the planetary wheels 23–25 which are mounted on rotational axles (not shown) on the planetary support 1. The planetary wheels 23–25 engage in the internal teeth 60b and 610 of the housing half 6b and the fixed ring gear 61, respectively. The ring gear 61 is preferably fixed by tabs 62 on the housing half 6b in which corresponding recesses are provided. As an alternative or in addition, the corresponding recesses can also be incorporated in the motor housing cover 53. The internal gears 610 and 60b have the same pitch diameter as well as the same number of teeth and the tabs 62 as well as the corresponding recesses in the housing half 6b are aligned so that the teeth of the internal gears 610 and 60b align with each other. As the sun wheel 26 rotates, the planetary wheels 23–25 mesh with the internal gears 610 and 60b and revolve about the motor output shaft 10 inside the internal gears 610 and 60b.

The internal gears 610 and 60b of the housing half 6b and ring gear 61 respectively are spaced axially relative to each other so that a clearance or gap is produced between the internal gears 610 and 60b in which the output element 4 is mounted for rotation. The internal gear 40 corresponds in pitch diameter substantially to the internal gears 610 and 60b but has a different number of teeth which is less by at least one tooth than the number for the internal gears 610 and 60b respectively.

Through the revolving action of the planetary wheels 23–25 on the fixed internal gears 610 and 60b and the simultaneous meshing of the internal gear 40 of the output element, the different number of teeth means that the output element 4 is advanced further in the direction of the revolution of the planetary wheels and is thus set in rotation. The window lifter cable 8, which is wound on the outside of the output element 4 as a cable drum is then moved in one or other direction depending on the direction of rotation of the motor output shaft 10.

All the gear elements, the motor shaft 10, the sun wheel 26 and the planetary wheels 23–25, are located inside the radius of the internal gear 40 of the drive element 4 and enable a very compact method of construction as a result of this arrangement.

It is obviously possible to design the planetary support fixed and thus to provide a conventional planetary gearbox. With a configuration of this kind, the fixed internal gears of the housing halves are not provided.

Figure 4:
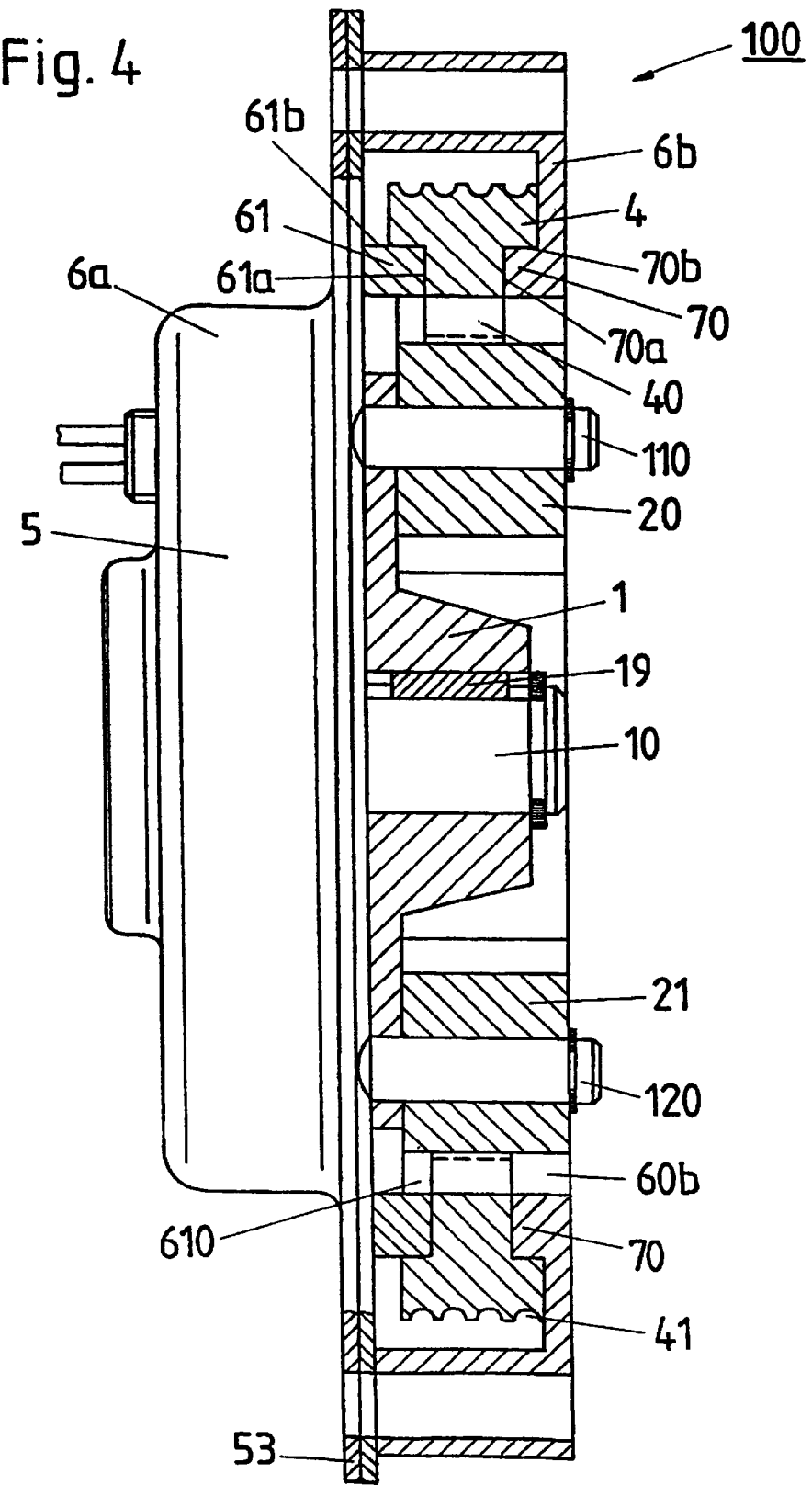
FIG. 4 shows a sectional view of a Wolfrom gear.

FIG. 4 shows, in a cross-sectional view, the drive 100 with the motor 5 and a set of revolving gear wheels coupled to the motor output shaft 10. The revolving gear wheels, here formed as a Wolfrom gear, consists of a planetary support 1 which is rotationally secured to the motor output shaft 10 through a spring key 19 and on which the planetary wheels 20 and 21 are rotatably mounted. The planetary wheels 20 and 21 are mounted on the rotational axles 110 and 120 which revolve around the motor output shaft 10 and mesh with both the internal gears 60b of the fixed housing half 6b, the internal gears 610 of the fixed ring gear 61 and with the internal gear 40 of the output element 4 which is formed as a hollow wheel.

The housing, in which the output element 4 is rotatably mounted, consists of two housing halves 6a and 6b which are connected together through connecting means (not shown). The two housing halves 6a and 6b form, together with the ring gear 61 in the assembled state, a groove through which the narrower section of the T-section output element 4 passes.

In order to be able to mount the output element on the motor output shaft 10 without any expensive support arrangement a bearing device 70 can be formed integral on the housing half 6b. The bearing device consists of a revolving ring whose external radius corresponds to the radius of the underneath of the leg of the output element 4 running parallel to the rotational axis. The leg has a larger radius than the internal gear 40 of the output element 4 so that, on the one hand, the fixed internal gear 60b is formed on the housing half 6b and, on the other hand, a bearing face 70a for taking up axial forces and a bearing face 70b formed parallel with the internal gear 60b for taking up radial forces are established perpendicular to the internal gear. The bearing device 70 is preferably arranged on the housing half 6b in a region between the internal gear 40 and the external radius of the output element 4, thus the grooves 41 for the cable socket are arranged in order that the lowest possible tilting moments of the output element 4 can occur. On the side of the output element 4 opposite the housing half 6b, the rotationally secured ring gear 61 is positioned in the assembled state, and performs the same function as the bearing device 70, ensuring a symmetrical bearing of the output element. The ring gear 61 likewise has two bearing faces 61a and 61b which take up axial and radial forces and transfer them to the housing half 6a.

Figure 4A:
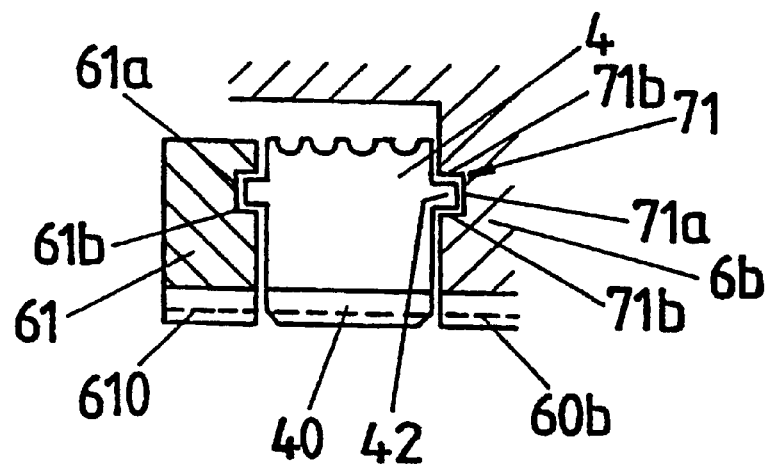
FIGS. 4a/4b show detailed views of the bearing of an output element.
Figure 4B:
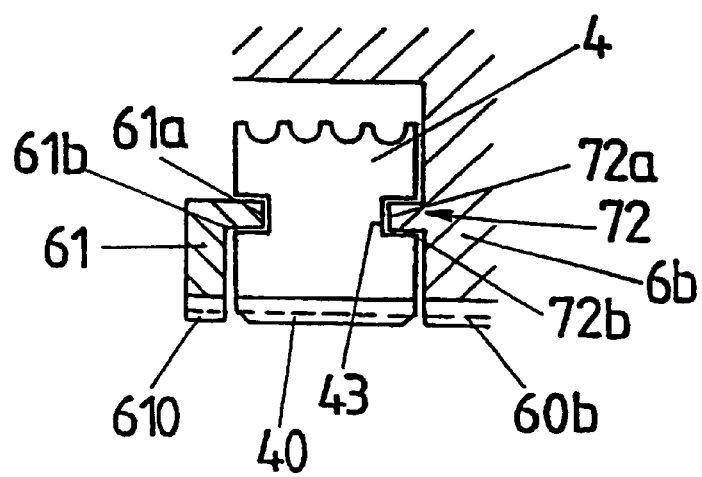

FIGS. 4a and 4b show further variations of the bearing device 70 whereby only the relevant section of the drive is illustrated. In FIG. 4a a bearing device 70 is incorporated on the housing half 6b in the form of a circumferential ring-shaped groove 71. The groove 71 can either be molded or it can be milled, turned or ground out. A shaped out area 42 of the output element 4 engages in this groove 71. The shaped out area 42 can consist of a ring, which can be placed in the groove 71 and rotates in the groove 71. In addition to the ring-shaped configuration, ring segments or individual pins can project out from the side wall of the output element 4 to engage in the groove 71 and support the output element 4 both radially and axially. The shaped out area 42 can be formed integral on the output element 4 or fixed thereon, for example by adhesive, welding or screws. The axial forces are thereby taken up by the base surface of the groove 71 and the radial forces by the side faces 71b.

FIG. 4b shows a reversal of the principle of FIG. 4a, wherein a guide element 72 is molded on the housing half 6b to engage in a groove 43 in the output element. The function thereby corresponds to that described in connection with FIG. 4a, wherein the guide element 72 engages like a slide block of a slide guide in the circumferential groove 43 of the output element 4, thereby providing the guidance and bearing for the output element 4. Axial forces are taken up through the end side 72a facing the output element and the radial forces are taken up through the side faces 72b. The guide element 72 can likewise be circumferentially ring-shaped or made from individual elements. As in FIG. 4, where the bearing device 70 or end face 70a projects into the output element 4 in the axial direction over the side face of the output element 4, through the configuration of FIG. 4b, the structural depth of the drive is reduced since the bearing is displaced in the direction of the center of the output element 4. On the other hand, in the configuration of FIGS. 4a and 4b, radial forces can be taken up in both directions by the groove 71 or by the guide element 72 respectively, whereby the bearing and arrangement of the bearing device can be designed with greater flexibility.

Through the described bearing where the bearing site of the output element 4 is formed through the housing halves or through one housing half and one bearing element, such as the ring gear 61, connected to the other housing half, the tilting movements of the output element 4 are transferred directly to the housing halves 6a and 6b. As a result of the correspondingly small leverage, the load is reduced to a conventional bearing on a central shaft. The design as a slide bearing, as described above, offers the advantage of economic manufacture and maintenance-free operation.

The method of functioning of the gearbox 6 will be described with reference to FIG. 4. On the inwardly directed end side of the output element 4 there is the internal gear 40 whose pitch diameter corresponds substantially to the pitch diameter of the internal gears 60b and 610 of the housing half 6b and ring gear 61 respectively and meshes with the toothed regions of the planetary wheels 20 and 21. This means that the teeth of the planetary wheels 20 and 21 mesh with both the internal gears 60b and 610 and also with the internal gear 40 of the output element 4.

Grooves 41 are shown on the outer circumference of the output element 4 for guiding a cable (not shown) which is used to operate the cable-driven window lifter. The method of operation for the gearbox will now be briefly explained.

The planetary support 1, which is rotationally secured to the motor output shaft 10 through the spring key 19 is set in rotation through the output shaft 10 of the motor 5. The rotational axles 110 and 120 of the planetary wheels 20 and 21 thereby revolve about the motor output shaft 10 and let the planetary wheels 20 and 21 likewise revolve about the motor output shaft 10. As a result of the rotatable bearing of the planetary wheels 20 and 21 about the rotational axles 110 and 120 and as a result of the engagement of the teeth of the planetary wheels 20 and 21 with the rotationally secured internal gears 60b and 610, the planetary wheels 20 and 21 rotate additionally about the rotational axles 110 and 120.

The planetary wheels 20 and 21 furthermore mesh with the internal teeth 40 of the rotationally mounted output element, whose number of teeth in the internal gear 40 differs from that in the internal gears 610 and 60*b* so that after one complete revolution of the planetary support 1, about 360 degrees, the output element is moved by the difference in the number of teeth. In this way a very high transmission ratio is reached, the result of which is that the motor 5 can be configured relatively small, a high speed can be generated and thus a lower output power is needed. Also in this way a high speed of the motor 5 can be transferred to a lower speed of the output element 4 with only one gear stage.

The housing half 6*b*, which is remote from the motor 5, is shown in the illustrated example with a cut out section in the region of the planetary wheels 20 and 21; it is however also conceivable that the housing half 6*b* has a mainly closed surface area and that all the gear elements, the rotational axles 110 and 120, the planetary wheels 20 and 21, the planetary support 1 and the motor output shaft 10, are covered by the housing 6*b*. The fixed internal gear 60*b*, which is formed as a hollow wheel is thus formed as a housing part whereby an increased degree of integration is achieved. In this way, the wet and dry space can be separated cost-effectively without the need for an expensive seal for the passage of the motor output shaft 10, for example through a carrier module or door inside panel. Only the connection of the housing halves 6*a* and 6*b* and the fixing on the carrier module or door inside panel then requires a conventional seal.

Obviously, it is possible to make the region with the grooves 41 wider or to form the gear elements 20 and 21 narrower axially so that the axial width of the gears is fixed substantially by the axial width of the output element 4 including the wall of the housing half 6*b*. All the gear elements are then located within the radius of the internal gear 40 of the output element 4 and project neither radially nor axially out from the output element 4.

Figure 5A:
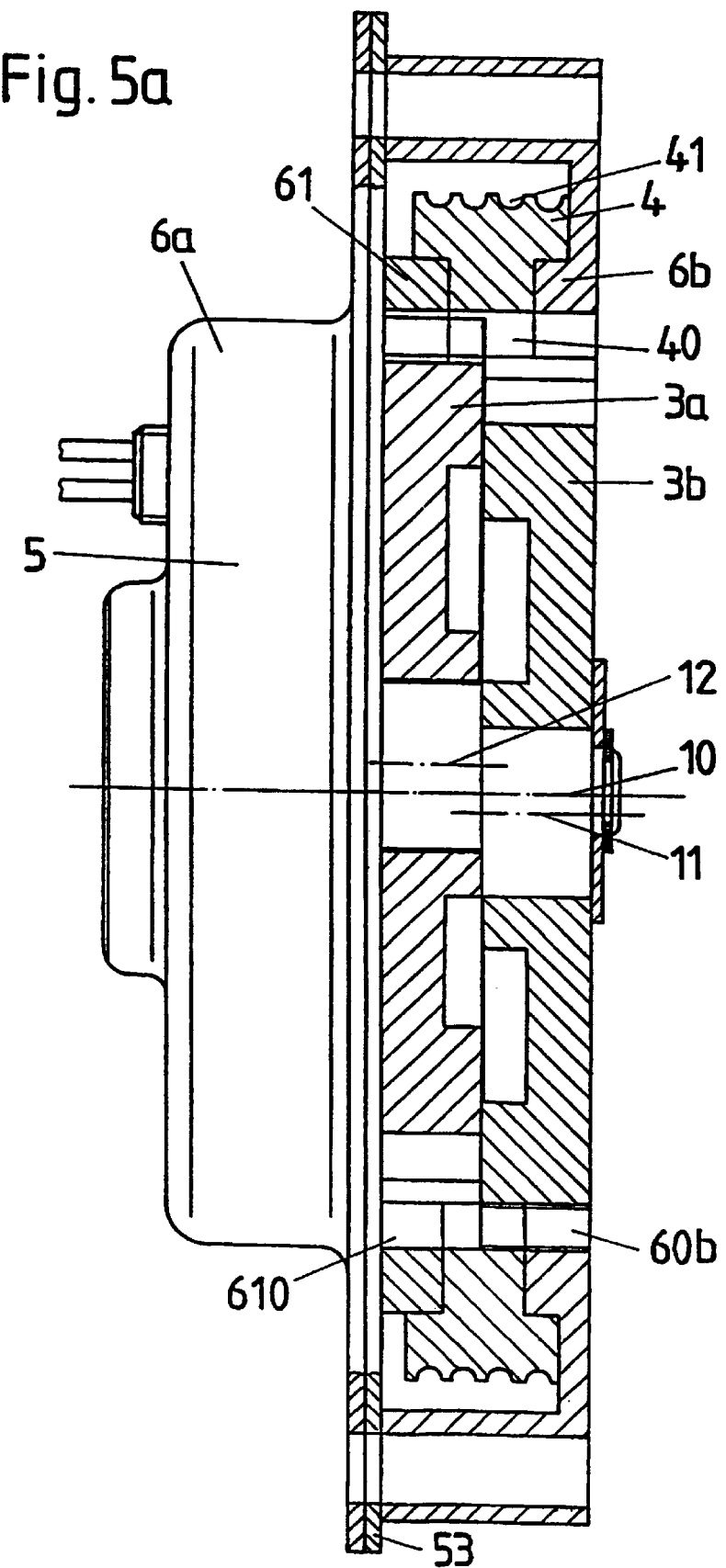
FIG. 5a shows a cross-sectional view of the wobble gearbox.
Figure 5B:
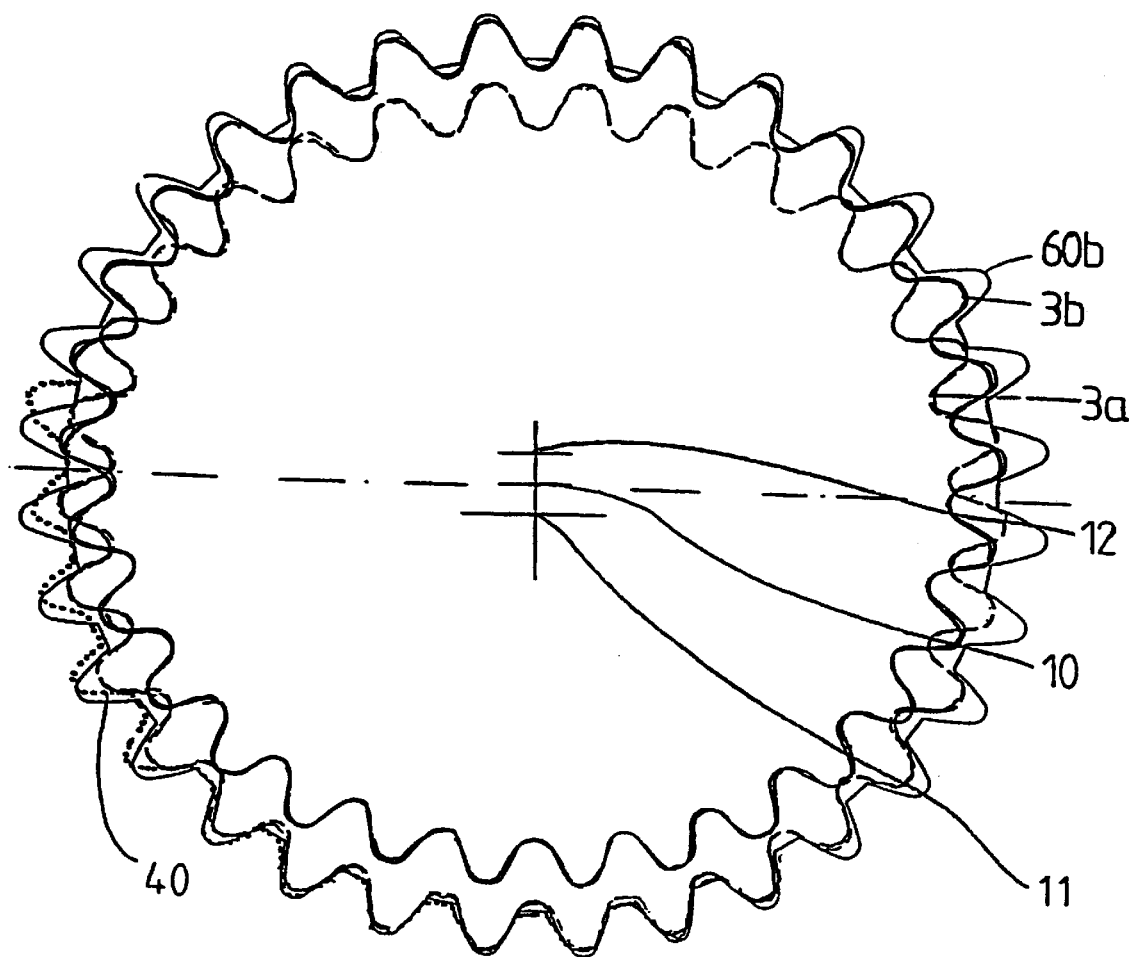

FIGS. 5*a* and 5*b* show a variation of the drive according to the invention in which the gearbox is formed as a wobble gearbox. The output element 4 is thereby rotatably mounted similar to the design according to FIGS. 1*a* and 4 in a two-part fixed housing wherein both the housing 6*b* and the output element 4 are each provided with internal gears 60*b* and 40. The ring gear 61 is likewise mounted rotationally secured with the internal gears 610 as in FIG. 4. The internal gears 40, 60*b* and 610 are engaged at the same time by two wobble wheels 3*a* and 3*b* mounted eccentric on the motor output shaft 10, whereby the wobble wheels 3*a* and 3*b* are arranged off-set by 180 degrees for reasons of dynamic balancing. The wobble wheels 3*a* and 3*b* are arranged axially off-set 15 relative to each other and therefore each mesh over half the width with the internal gear 40 of the output element 4.

Two eccentrics 11 and 12 are mounted on the motor output shaft 10. The eccentrics have the same eccentricity relative to the axis of rotation of the motor output shaft 10 and are off-set by 180 degrees. Wobble wheels 3*b* and 3*a* are rotably mounted rotatable on the eccentrics, 11 and 12 respectively, whereby the pitch diameter of the wobble wheels 3*b* and 3*a* is selected so that the teeth of the wobble wheels 3*b* and 3*a* mesh with the fixed internal gears 60*b* and 610 and the internal gear 40 of the output element 4. During rotation of the motor output shaft 10, the eccentrics 11 and 12 revolve about the rotational axis of the motor output shaft 10 and the wobble wheels 3*a* and 3*b* each roll on the fixed internal gears 60*b* and 610. Since the toothed regions of the wobble wheels 3*b* and 3*a* at the same time also mesh with the internal gear 40 of the output element 4, the output element 4 is displaced forwards as a result of the different number of teeth in the internal gears 40, 60*b* and 610. The window lifter cable 8, which is wound onto the cable drum grooves 41, is thereby moved accordingly.

FIG. 5*b* shows a diagrammatic plan view of the wobble gearbox according to FIG. 5*a* from which it can be seen that both the wobble wheel 3*a* and the wobble wheel 3*b* run down inside the radius of the internal gear 40 of the output element and the fixed internal gear 60*b* and it also shows how the eccentrics 11 and 12 are arranged in relation to the rotational axis of the motor output shaft 10. The internal gear 40 of the output element 4 is shown in chain dotted lines, whereby it can be seen on the left hand edge of the drawing that the internal gears 40 and 60*b* have a different number of teeth and that the output element 4 is rotated as a result of the difference in the number of teeth and the engagement of the wobble wheels 3*a* and 3*b* in the rotationally secured internal gear 60*b*.

Also here a very narrow construction can be achieved through a correspondingly axially narrow design of the gear elements, more particularly the wobble wheels 3*a* and 3*b*similarly the axial width of the gears corresponds substantially to the width of the output element 4.

Figure 6:
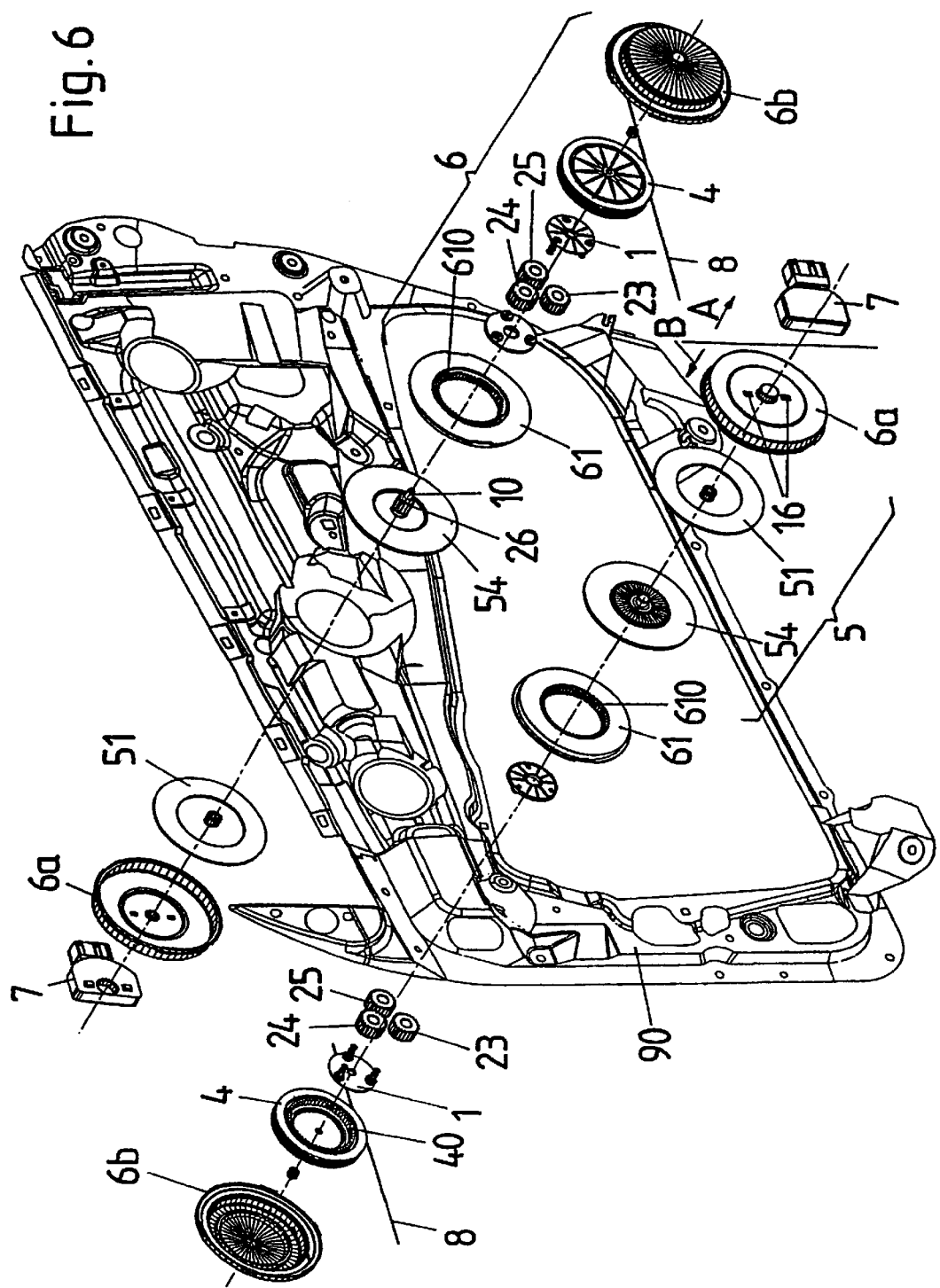
FIG. 6 shows an exploded view of a drive in conjunction with a door inside panel of a motor vehicle door as the base part.

FIG. 6 shows an exploded view of the drive for a cable window lifter having a disc rotor motor 5, a planetary gearbox 2 with planetary wheels 23, 24 and 25, as well as an electronics unit 7 which governs the motor 5, in two opposite views relative to a door inside panel 90 of a vehicle door as the base part.

The motor 5 and gearbox 2 are enclosed by two housing halves 6*a* and 6*b* having openings for the inlet and exit of a window lifter cable 8. The electronics unit 7 houses brushes and sensors (not shown), for example for detecting the speed or setting of the motor 5, and it is proposed that the electronics unit 7 is mounted on the dry space side A while the motor 5 and gearbox 2 are mounted on the wet space side B of the vehicle door or door inside panel 90. The brushes, sensors and connections for the power supply are mounted in the dry space side A, which is separated from the wet space side B for example, through a carrier module, while the remaining components of the drive, namely the motor 5 and the gearbox 2 with the housing halves 6*a* and 6*b*, are located on the wet space side B.

The housing half 6*a* on the motor side has openings 16 for the brushes and the like which pass through from corresponding elements. On the side of the motor-side housing half 6*a*, remote from the electronics unit 7, is a magnetic feedback disc 51, a rotor disc 54 and a ring gear 61 formed as a magnetic disc. The motor-side housing half 6*a*, the rotor disc 54, the magnetic feedback disc 51 and the rotationally secured magnetic disc 61 with integrated feedback and integrated internal gears 610 together form the disc rotor motor 5, which is completed by the electronics unit 7. The drive shaft 10 is fixed on the rotor disc 54 and generates the transfer of rotary movement to the planetary gearbox 2.

A fitted or molded sun wheel 26 is mounted, secured against rotation, on the drive shaft 10 and meshes with the three planetary wheels 23, 2, 25, which are rotatably mounted on the planetary support 1. The planetary support 1 is thereby rotatably mounted on the drive shaft 10. The planetary wheels 23, 24, 25 are in engagement with both the internal gear 40 of the output element 4 and with the internal gears 610 of the rotationally secured ring gear 61 acting as magnetic disc, and revolve as a result of the rotational bearing of the planetary support 1 in the internal gears 40 and 610. The output element 4, which is driven thereby, then moves the window lifter cable 8, which is looped round the circumference of the output element, into the corresponding direction.

In this embodiment, the door inside panel 90 forms the base part on which the drive is fixed. This base part, which can in an alternative design be formed by a carrier module or carrier plate, can be incorporated as a support or stabilizing element into the construction of the drive, for example, by creating the base part as a constituent part of the gear housing. Through a corresponding manufacturing process, the base part can then be formed for example, as a housing half on the motor side so that the remaining constituent parts of the motor 5 and gearbox 6 need then only be fitted on and fastened. In the present example, such an assembly of the motor and gear components would take place from the wet space side. The base part, for example a carrier module, could thus be prefabricated as a complete unit and then in a final assembly stage the electronics unit 7 would only have to be fitted on from the wet space side.

Furthermore it is proposed that the base part is formed as a constituent part of the magnetic feed back whereby the structural parts and assembly costs can be reduced.

In order to avoid unnecessary noises and for a simpler compensation of tolerances it is proposed to coat all the toothed regions with a plastic coating so that a soft rolling behavior is reached with a low noise level.

What is claimed is:

1. A drive for adjustment devices in motor vehicles comprising:
   a motor;
   a toothed gear assembly coupled to the motor and arranged in an at least two-part housing, the toothed gear assembly having an output element formed as an internally toothed hollow wheel; and
   a bearing device formed on at least one of the at least two-part housing, wherein the output element is mounted on the bearing device such that the bearing device is arranged in a region between the internal teeth and an outer radius of the output element.

2. The drive according to claim 1 wherein the bearing device is one of a ring-shaped groove and a guide element.

3. A drive for adjustment devices in motor vehicles comprising:
   a motor;
   a toothed gear assembly coupled to the motor and arranged in an at least two-part housing, the toothed gear assembly having an output element formed as an internally toothed hollow wheel; and
   a ring-shaped bearing device formed on at least one of the at least two-part housing, wherein the output element is mounted on the bearing device such that an external circumference of the ring-shaped bearing device corresponds to the inner circumference of the output element.

4. The drive according to one of claims 1 or 3 wherein the bearing device is formed on each of the at least two-part housing part.

5. The drive according to claim 1 or 3 wherein the bearing device is a slide bearing.

6. The drive according to claim 1 or 3 wherein the toothed gear assembly and the motor are mounted inside the at least two-part housing.

7. The drive according to claim 1 or 3 wherein one of a carrier module and a door inside panel is one part of the at least two-part housing.

8. The drive according to claim 7 wherein one of the door inside panel and the carrier module is a constituent part of a magnetic feedback.

9. The drive according to claim 7 wherein at least one of the at least two-part housing has a fixed internal gearing formed as a hollow wheel.

10. The drive according to claim 9 wherein the toothed gear assembly contains gear elements for transferring force to the output element and wherein the gear elements mesh with both the internal teeth of the output element and with the internal gearings of at least one of the at least two-part housing.

11. The drive according to claim 9 wherein the number of teeth in the internally toothed hollow wheel of the output element is different by at least one tooth from the number of teeth in the internal gearing of the at least two-part housing.

12. The drive according to claim 9 wherein teeth of the gear elements engage both in the internal gearings of at least one of the at least two-part of the housing and in the internal teeth of the output element.

13. The drive according to claim 9 wherein at least one of the at least two-part housing has the internal gearing that is molded.

14. The drive according to claim 9 wherein at least one of the at least two-part housing has an internal gearing formed as a ring gear that is mounted to one of the housing parts.

15. The drive according to claim 14 wherein teeth of the gear elements engage in the internal gearings of at least one of the at least two-part housing, in the internal teeth of the output element and in an internal gearing of the ring gear.

16. The drive according to claim 1 or 3 wherein the output element is one of a cable drum and externally splined.

17. The drive according to claim 1 wherein the gear elements are mounted inside the radius of the internal teeth of the hollow wheel of the output element.

18. The drive according to claim 1 or 3 wherein the toothed gear assembly comprises a set of revolving gear wheels in combination with one of a Wolfrom and planetary gear.

19. The drive according to claim 1 or 3 wherein the toothed gear assembly comprises a set of revolving gear wheels in combination with one of a tumbler and harmonic drive gear.

20. The drive according to claim 19 wherein the toothed gear assembly includes the tumbler gear, which has two tumbler wheels arranged off-set by 180 degrees.

21. The drive according to claim 1 wherein an axial extension of the gear elements is one of smaller than and equal to a maximum axial extension of the output element.

22. The drive according to claim 1 wherein the teeth of the gear elements and of the output element comprise a plastic coating.

23. The drive according to claim 1 or 3 wherein the motor is a flat motor.

24. The drive according to claim 1 wherein the components of the drive can be fitted together in one assembly direction.

25. The drive according to claim 1 or 3 further comprising means for supplying current to the motor, the means being provided in an electronics unit that is connected to the motor through openings in the at least two-part housing.

26. The drive according to claim 25 wherein the electronics unit comprises sensor elements that are coupled through openings in the at least two-part housing with one of the motor and the toothed gear assembly.

* * * * *

UNITED STATES PATENT AND TRADEMARK OFFICE
CERTIFICATE OF CORRECTION

PATENT NO. : 6,629,905 B1  Page 1 of 1
DATED : October 7, 2003
INVENTOR(S) : Sesselmann et al.

It is certified that error appears in the above-identified patent and that said Letters Patent is hereby corrected as shown below:

Column 11,
Line 54, delete "housing part", insert -- housing --

Column 12,
Line 16, delete "two-part of the housing", insert -- two-part housing --
Line 43, delete "off-set", insert -- offset --

Signed and Sealed this

Twenty-first Day of June, 2005

JON W. DUDAS
*Director of the United States Patent and Trademark Office*